United States Patent
Hayashi et al.

(10) Patent No.: US 6,726,456 B2
(45) Date of Patent: Apr. 27, 2004

(54) FOREIGN MATTER REMOVING STRUCTURE IN A FLUID CIRCUIT AND A COMPRESSOR THEREWITH

(75) Inventors: Shiro Hayashi, Kariya (JP); Minoru Mera, Kariya (JP); Hideki Mizutani, Kariya (JP)

(73) Assignee: Kabushiki Kaisha Toyota Jidoshokki, Kariya (JP)

(*) Notice: Subject to any disclaimer, the term of this patent is extended or adjusted under 35 U.S.C. 154(b) by 0 days.

(21) Appl. No.: 10/091,799

(22) Filed: Mar. 6, 2002

(65) Prior Publication Data

US 2002/0131876 A1 Sep. 19, 2002

(30) Foreign Application Priority Data

Mar. 13, 2001 (JP) ......................... 2001-070755

(51) Int. Cl.[7] .................. F04B 23/00; B01D 46/42; B01D 46/00; B01D 50/00
(52) U.S. Cl. .................. 417/313; 55/309; 55/350.1; 55/486; 55/DIG. 17
(58) Field of Search .................. 417/313; 55/309, 55/350.1, 419, 486, DIG. 17

(56) References Cited

U.S. PATENT DOCUMENTS

| | | | | |
|---|---|---|---|---|
| 1,809,834 A | * | 6/1931 | Davenport | 62/85 |
| 1,859,766 A | * | 5/1932 | Davenport | 62/474 |
| 2,816,621 A | * | 12/1957 | Weaver | 55/419 |
| 5,051,116 A | * | 9/1991 | Mattsson | 95/260 |
| 5,402,655 A | | 4/1995 | Mangyo et al. | 62/474 |
| 5,431,706 A | * | 7/1995 | Paas | 55/342 |
| 5,562,427 A | | 10/1996 | Mangyo et al. | 417/313 |

FOREIGN PATENT DOCUMENTS

| | | |
|---|---|---|
| JP | A-9-250455 | 9/1997 |
| JP | A-10-103246 | 4/1998 |
| JP | A-11-303755 | 11/1999 |
| JP | A-2000-213831 | 8/2000 |

* cited by examiner

Primary Examiner—Justine R. Yu
Assistant Examiner—Timothy P. Solak
(74) Attorney, Agent, or Firm—Woodcock Washburn LLP (57) ABSTRACT

A filter 42 comprises a cylindrical filter body 45 which is disposed in a suction passage 41, a lid portion 47 which closes an opening 45b positioned in a downstream side of the suction passage 41 in the filter body 45, communication holes 48 which penetrate through the filter body 45 and communicate the inside of the filter body 45 with the outside thereof, and filter elements 49, 50 which are disposed downstream of the communication holes 48 and the lid portion 47, in the filter body 45; wherein a gap between an outer circumferential surface 45c of the filter body 45 and an inner circumferential surface 45a of the suction passage 41 is closed upstream of the communication holes 48.

14 Claims, 4 Drawing Sheets

FOREIGN MATTER REMOVING STRUCTURE IN A FLUID CIRCUIT AND A COMPRESSOR THEREWITH

BACKGROUND OF THE INVENTION

1. Field of the Invention

The present invention relates to a foreign matter removing structure, which can be applied to refrigerant circulating circuits (refrigeration cycles) for systems such as air conditioning systems, etc., and is used for removing foreign matter in a refrigerant gas flowing through the refrigerant circulating circuits.

2. Description of the Related Art

As this kind of foreign matter removing structure, for example, Japanese Unexamined Patent Publication (Kokai) No. 6-235569 discloses that a filter is disposed in a refrigerant passage.

However, in the art in the prior publication described above, a simple construction in which the filter is arranged so as to disturb the refrigerant flow is used. Therefore, if blockage of the element of the filter occurs, the refrigerant flow is unnecessarily reduced in the element, resulting in deterioration of the efficiency of the refrigeration cycle and a decrease of the capacity of the air conditioning system.

SUMMARY OF THE INVENTION

The purpose of the present invention is to provide a foreign matter removing structure, which maintains its removing function for foreign matter even if blockage of a filter element occurs and which disturbs a fluid flow as little as possible.

To realize the above-mentioned purpose, the first aspect of the present invention provides a foreign matter removing structure characterized in that it includes a filter which can remove foreign matter in a fluid flowing through a fluid circuit wherein the filter comprises; a cylindrical filter body which is disposed in a fluid passage of the fluid circuit, a lid portion installed so as to close an opening positioned downstream of the fluid passage in the filter body, communication holes which penetrate through the filter body and communicate the inside of the filter body with the outside thereof, and one or a plurality of filter elements which are disposed in the filter body and/or the lid portion so as to be positioned more downstream than the communication holes; wherein a gap between an outer circumferential surface of the filter body and an inner circumferential surface of the fluid passage is closed at the upstream side of the communication holes.

In the above construction, a fluid flowing into the fluid passage then flows into the filter body through an opening in an upstream side. A part of the fluid flowing into the filter body is discharged to the outside of the filter body while foreign matter is removed by the filter elements.

Also, a part of the fluid flowing into the filter body is discharged to the outside of the filter body through the communication holes. The fluid discharged to the outside of the filter body flows through a space between the outer circumferential surface of the filter body and the inner circumferential surface of the fluid passage to be discharged to the downstream side of the filter. The flow direction of the fluid passing through this flow route is sharply changed when it is discharged out of the filter body. As a result, the foreign matter in the fluid are centrifugally separated from the fluid when the fluid flow direction is sharply changed.

On the other hand, if a blockage occurs in the filter elements, it becomes difficult for the fluid in the filter body to flow through the filter elements and to be discharged from the filter body. However, other than a first route in which a fluid flows through the filter elements and is discharged, a second discharging route including the communication holes therein is provided as a route for discharging the fluid out of the filter body. Therefore, even if a blockage occurs in the filter elements, that is, in the first route, the second route allows the fluid to pass therethrough, so that the function of removing foreign matter can be maintained and at the same time it can be prevented, as much as possible, that the fluid flow is disturbed by the filter.

The second aspect of the present invention according to the first aspect thereof is characterized in that the filter elements are disposed in the filter body and the lid portion.

In this construction, the filter elements have a three dimensional arrangement as a whole, so that the filtering of the fluid by the element is accomplished widely on the surfaces provided in the three dimensional arrangement and the foreign matter removing capacity (the capacity preventing foreign matter from passing downstream) of the present structure is improved.

The third aspect of the present invention according to either of the first or the second aspect thereof is characterized in that, in the fluid passage, a foreign matter holding recess is formed below the communication holes.

In this construction, foreign matter separated in the second route is surely held in the foreign matter holding recess, so that the foreign matter removing capacity of the present structure is improved.

The fourth aspect of the present invention provides a foreign matter removing structure characterized in that it includes a filter which can remove foreign matter in a fluid flowing through a fluid circuit wherein the filter comprises; a cylindrical filter body which is disposed in a fluid passage of the fluid circuit, a lid portion installed so as to close an opening positioned upstream of the fluid passage in the filter body, communication holes which penetrate through the filter body and communicate the inside of the filter body with the outside thereof, and one or a plurality of filter elements which are disposed in the filter body so as to be positioned downstream of the communication holes; wherein a gap between an outer circumferential surface of the filter body and an inner circumferential surface of the fluid passage is closed downstream of the filter elements.

In the above construction, a fluid flowing into the fluid passage is then forced to flow through at the side of the lid portion by the lid portion opposing the fluid flow. A part of the fluid flowing through the side of the lid portion flows through a space between the outer circumferential surface of the filter body and the inner circumferential surface of the fluid passage to flow into the inside of the filter body, while foreign matter is removed by the filter elements. The fluid, flowing into the inside of the filter body after foreign matter is removed, is discharged out of the filter body through a hole on the downstream side.

The flow direction of a part of the fluid flowing through the side of the lid portion in the fluid passage is sharply changed and the fluid is turned around the outer circumferential edge of the lid portion and part of the fluid flows into the filter body through the communication holes. As a result, the foreign matter in the fluid is centrifugally separated from the fluid by the sharp change of the fluid flow direction and the foreign matter falls into a space between the outer circumferential surface of the filter body and the inner circumferential surface of the fluid passage, that is, inside the foreign matter holding recess positioned in the area lower than the communication holes, and is held in the space. The fluid, which flows into the filter body and from which the foreign matter is removed, is discharged out of the filter body through a hole located downstream.

In this aspect of the present invention, as in the first aspect thereof described above, other than the first route in which the fluid flows through the filter elements and is discharged, a second route, including the communication holes through which the fluid passes, is provided. Therefore, even if blockage of the filter elements, that is, in the first route, occurs, the second route allows the fluid to pass therethrough, so that the function of removing foreign matter can be maintained and at the same time it can be prevented, as much as possible, that the fluid flow is disturbed by the filter.

The fifth aspect of the present invention according to the fourth aspect thereof is characterized in that the filter element is also disposed in the lid portion.

In this construction, a new fluid passage, in which a fluid passes through the filter element in the lid portion into the filter body, is formed. Therefore, the foreign matter removing capacity of the present structure is improved.

The sixth aspect of the present invention, according to either of the fourth or the fifth aspect thereof, is characterized in that, on the outer circumferential surface of the filter body, a convex portion is provided upstream of the communication holes.

In this construction, due to the convex portion, the effect of sharp change of the fluid flowing direction in which the fluid flows into the communication holes through the side of the lid portion is enhanced and the centrifugal separation of the foreign matter is effectively accomplished.

The seventh aspect of the present invention according to the sixth aspect thereof is characterized in that the outer circumferential surface of the convex portion is formed in a tapered shape which has a smaller diameter on the communication holes side.

In this construction, due to the outer circumferential surface, of the convex portion, being formed in a tapered shape, the fluid is guided to flow into the communication holes, so that the effect of sharp change of the fluid flowing direction, by the convex portion, is more effectively realized.

The eighth aspect of the present invention according to any one of the fourth to the seventh aspects thereof is characterized in that the outer end surface of the lid portion is formed in a cone shape which opposes the fluid flow.

In this construction, the effect of sharp change of the fluid flowing direction at the outer circumferential edge of the lid portion is enhanced more than in the case in which the outer end surface of the lid portion is formed as a flat plane, for example.

The ninth aspect of the present invention is a compressor characterized in comprising the foreign matter removing structure, according to any one of the first to the eighth aspects of the present invention, in a gas passage in the inside of the housing.

In this construction, even if blockage occurs in the filter elements, the function of removing foreign matter can be maintained and at the same time it can be prevented, as much as possible, that the gas flow passing through the filter is disturbed.

The compressor according to the ninth and the tenth aspects of the present invention is a variable displacement type and the gas passage is used for the displacement control of the compressor.

The present invention may be more fully understood from the description of the preferred embodiments of the invention, as set forth below, together with the accompanying drawings.

DESCRIPTION OF THE PREFERRED EMBODIMENTS

The first to the third embodiments of the present invention, which is embodied in a foreign material removing structure in a swash-plate compressor of a variable displacement type, which an air conditioning system for a vehicle comprises, are described below. Here, for the second and the third embodiments only, the features thereof different from those of the first embodiment are described. The same or the like components, of the second and the third embodiments, as those of the first embodiment are denoted with the same reference numbers thereof and the descriptions are omitted.

First Embodiment (A Swash Plate Compressor of a Variable Displacement Type)

Figure 1:
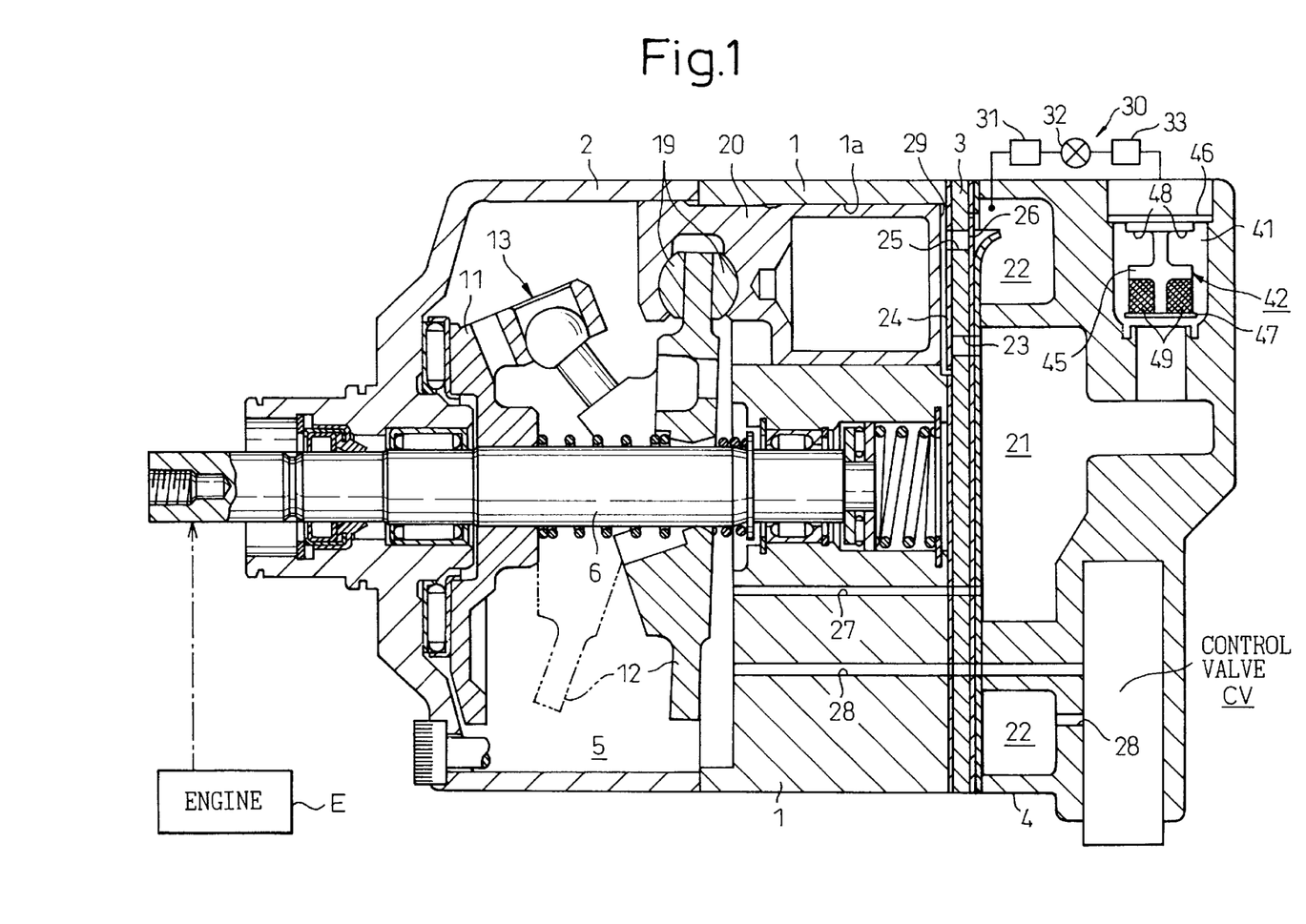
FIG. 1 is a cross sectional view of a swash plate compressor of a variable displacement type.

As shown in FIG. 1, a swash-plate compressor of a variable displacement type (hereinafter referred to as a compressor) comprises a cylinder block 1, a front housing 2 coupled to the front end of the cylinder block 1, and a rear housing 4 coupled to the rear end of the cylinder block 1 via a valve and port forming body 3. Thus the cylinder block 1, the front housing 2, and the rear housing 4 constitute a housing of the compressor.

In the region surrounded by the cylinder block 1 and the front housing 2, a crank chamber 5 which is a housing chamber for a swash plate 12 is defined. In the crank chamber 5, a drive shaft 6 is disposed, so that reciprocation is possible. The drive shaft 6 is connected to an engine E, which is a vehicle power source, that is, an external driving source, so that the driving shaft can be operated.

A lug plate 11 is secured on the drive shaft 6 in the crank chamber 5 so that rotation is integrally possible. A swash plate 12 as a cam plate is housed in the crank chamber 5. The swash plate 12 is supported by the drive shaft 6 so that it can slide and tilt. A hinge mechanism 13 is interposed between the lug plate 11 and the swash plate 12, so that the swash plate 12 can synchronously rotate with the lug plate 11 and the drive shaft 6 due to the hinge connection of the swash plate 12 with the lug plate 11 through the hinge mechanism 13 and the support of the drive shaft 6 and, at the same time, the swash plate 12 can tilt against the drive shaft 6, while sliding in the axial direction of the drive shaft 6.

A plurality of (only one is shown in FIG. 1) cylinder bores 1a are formed in the cylinder block 1 and penetrate therethrough in a manner surrounding the drive shaft 6. A single-headed piston 20 is housed in each cylinder bore 1a so that reciprocation is possible. Openings formed at the front and at the rear end of each cylinder bore 1a are closed by the valve and port forming body 3 and the piston 20, and a compression chamber 29 which varies its volume according to the reciprocating motion of the piston 20 is defined in the each cylinder bore 1a. Each piston 20 is coupled to the outer circumferential portion of the swash plate 12 via shoes 19, so that this enables the rotating motion of the swash plate 12, according to the rotating motion of the drive shaft 6, to be converted to a reciprocating linear motion of the pistons 20 through the shoes 19.

Further, between the valve and port forming body 3 and the rear housing 4, a discharge chamber 22 and a suction chamber 21 are defined, respectively. The refrigerant gas in the suction chamber 21 is, then, drawn into the compression chamber 29, through a suction port 23 and a suction valve 24 which are formed in the valve and port forming body 3, in accordance with the movement of each piston 20 from the upper dead point thereof to the lower dead point thereof. The refrigerant gas drawn into the compression chamber 29 is compressed to the desired pressure by the piston 20, which is moved from the lower dead point thereof to the upper dead point thereof, and is discharged into the discharge chamber 22 through a discharge port 25 and a discharge valve 26 which are formed in the valve and port forming body 3.

A bleed passage 27, a supply passage 28, and a control valve CV are provided in the housing of the compressor. The suction chamber 21 is connected to the crank chamber 5 through the bleed passage 27. Further, the discharge chamber 22 is connected to the crank chamber 5 through the supply passage 28. The control valve CV which consists of, for example, an electromagnetic valve is provided in the supply passage 28.

The balance between the in-flow rate of the high pressure discharge gas to the crank chamber 5 through the supply passage 28 and the out-flow rate of the gas from the crank chamber 5 through the bleed passage 27 is controlled by adjusting the opening of the above-mentioned control valve CV and then the internal pressure of the crank chamber 5 is determined thereby. When the pressure difference between the internal pressure of the crank chamber 5 and the internal pressure in the compression chamber 29, via the piston 20, is varied according to the internal pressure change of the crank chamber 5 and when the inclination angle of the swash plate 12 is changed, the stroke of the piston 20, that is, the discharge displacement is regulated. When the control valve CV decreases its opening, the displacement of the compressor is increased and, on the contrary, when the control valve CV increases its opening, the displacement of the compressor is decreased.

The suction chamber 21 of the compressor is connected to the discharge chamber 22 thereof through an external refrigerant circuit 30 as an external circuit. The external refrigerant circuit 30 comprises a condenser 31, an expansion valve 32 which is a pressure reducing device, and an evaporator 33. The refrigerant circulation circuit (a refrigeration cycle) of an air conditioning system for a vehicle, as a fluid circuit, is constituted by the compressor and the external refrigerant circuit 30.

(Foreign Matter Removing Structure)

Figure 2A:
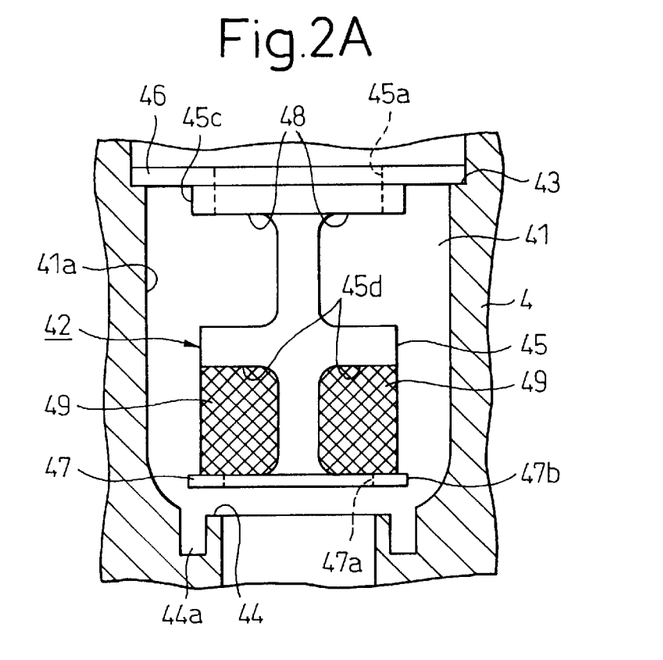
FIG. 2A is an enlarged view in the vicinity of a filter in FIG. 1.
Figure 2B:
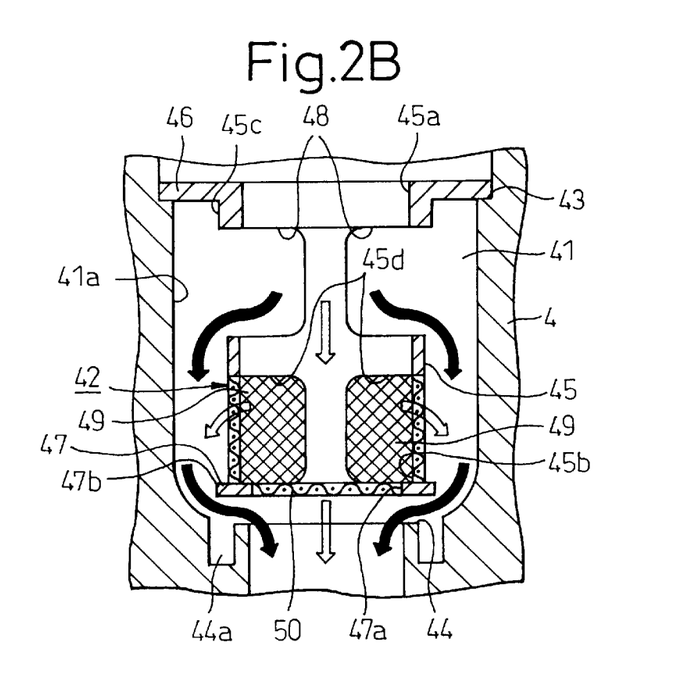
FIG. 2B is a longitudinal sectional view of the filter in FIG. 2A.

As shown in the FIGS. 1, 2A and 2B, a suction passage 41 which is a fluid passage and communicates the suction chamber 21 with the external refrigerant circuit 30 is formed in the rear housing 4 of the compressor. In the suction passage 41, a filter 42, which is used for removing foreign matter in a refrigerant gas flowing from the external refrigerant circuit 30 (an evaporator 33) into the suction chamber 21, is located.

That is, in the suction passage 41 in the rear housing 4, a first step portion 43 which has a larger diameter on the external refrigerant circuit 30 side is formed in an annular shape. A second step portion 44 is formed in an annular shape, downstream of the first step portion 43 (the suction chamber 21 side), in the suction passage 41. The second step portion 44 has a larger diameter on the external refrigerant circuit 30 side which is similar to the first step portion 43.

The filter 42 comprises a cylindrical filter body 45. In the outer circumferential surface 45c of the filter body 45, a flange portion 46 is provided in the vicinity of an opening 45a positioned in the upstream side in the suction passage 41. The filter body 45 is pressed into the suction passage 41 from the external refrigerant circuit 30 side by means of the flange portion 46 and the flange portion 46 comes into contact with the first step portion 43, so that the filter body 45 is secured in the rear housing 4 and is positioned therein. Therefore, an annular gap between the outer circumferential surface 45c of the filter body 45 and the inner circumferential surface 41a of the suction passage 41 is closed in the state that the annular area of the first step portion 43 comes into contact with the annular area of the flange portion 46.

In the filter body 45, a lid portion 47 is provided so that it closes an opening 45b positioned in the downstream side of the suction passage 41. The outer circumferential edge portion 47b of the lid portion 47 slightly extends out from the outer circumferential surface 45c of the filter body 45. A through hole 47a is provided in the central portion of the lid portion 47. More downstream than the flange portion 46 in the filter body 45, a plurality (two in this embodiment) of communication holes 48 which communicate the inside of the filter body 45 with the outside thereof are provided around the axis of the filter body 45 with a constant interval so that the communication holes 48 penetrate therethrough. More downstream than the communication holes 48 in the filter body 45, a pair of through holes 45d is provided around the axis of the filter body 45 with a constant interval.

Filter elements 49 and 50 are installed in the filter body 45 and the lid portion 47 so as to close each of the through holes 45d and 47a. The filter elements 49 and 50 are made of a material such as a net, a plate with many holes, or a porous plate.

In the suction passage 41, a foreign matter holding recess 44a is provided, in an annular shape, on the upper end surface of the second step portion 44 positioned lower than the filter 42 (the communication holes 48).

(Effect of a Foreign Matter Removing Structure)

A refrigerant gas which flows from the external refrigerant circuit 30 (an evaporator 33) to the suction passage 41 flows into the filter body 45 through the opening 45a in the upstream side. Most of the refrigerant gas flowing into the filter body 45 passes through either of the following two routes to consequently flow into the suction chamber 21.

First Route

A part of the refrigerant gas flowing into the filter body 45 is discharged to the outside of the filter body 45 through the filter elements 49 and 50, as shown in FIG. 2B by white arrows, while foreign matter is removed by the filter elements 49 and 50.

Second Route

A part of the refrigerant gas flowing into the filter body 45 is discharged to the outside of the filter body 45 through the communication holes 48, as shown in FIG. 2B by black arrows. The refrigerant gas discharged to the outside of the filter body 45 flows through a space between the outer circumferential surface 45c of the filter body 45 and the inner circumferential surface 41a of the suction passage 41 and passes through a space between the second step portion 44 and the lid portion 47 so as to flow to the suction chamber 21 side.

The flowing direction of the refrigerant gas passing through this route is sharply changed, both when it is discharged out of the filter body 45 and when it passes through the space between the second step portion 44 and the lid portion 47. Therefore, by the sharp change of the flow direction of the refrigerant gas, foreign matter in the refrigerant gas, which has a larger specific gravity than that of the refrigerant gas, are centrifugally separated. Most of the foreign matter separated from the refrigerant gas is moved (falls) toward the inner bottom surface of the filter body 45 (the filter elements 49 and 50) or the upper end surface of the second step portion 44 (the foreign matter holding recess 44a) by gravity and are held in the filter elements 49, 50 or the foreign matter holding recess 44a.

As described above, the foreign matter in the refrigerant gas can be removed whichever route the refrigerant gas takes, so that the foreign matter can be prevented from entering the compressor (the suction chamber 21) from the external refrigerant circuit 30. Therefore, for example, the foreign matter can be prevented from being engaged with each sliding portion, within the compressor, such as spaces formed between the pistons 20 and the cylinder bores 1a or between the swash plate 12 and the shoes 19, thus preventing the performance and the durability of the compressor from being deteriorated.

In the present embodiment the following effects can be obtained.

(1) For example, if blockage of the filter elements 49, 50 occurs, it becomes difficult for a refrigerant gas in the filter body 45 to be discharged out of the filter body 45 through the filter elements 49, 50. However, as a route in which the refrigerant gas passes through the filter 42, a second route is provided other than the first route including the filter elements 49, 50. Thus in spite of the blockage of the filter elements 49, 50, that is, blockage of the first route, the second route allows the refrigerant gas to smoothly pass therethrough, so that the function of removing foreign matter can be maintained and, at the same time, it can be prevented, as much as possible, that the refrigerant gas flow is disturbed by the filter 42. As a result, the efficiency of a refrigerant cycle or the performance of an air conditioning system can preferably be maintained.

(2) The second route is constituted so that the refrigerant gas flow direction is sharply changed to remove foreign matter in the refrigerant gas. That is, the second route is constituted so that it does not depend on the filter elements 49, 50 in removing foreign matter in the refrigerant gas. Therefore, in the second route there is no risk of blockage of the filter elements 49, 50, and the effects in item (1) described above is surely realized.

(3) The filter elements 49, 50 are arranged in the lid portion 47 and the filter body 45, respectively, and have a three-dimensional shape (a cylindrical shape having a bottom), as a whole. Therefore, the filtering of the refrigerant gas is accomplished widely on the surfaces provided in the three dimensional shape thereof and the foreign matter removing capacity of this structure (the capacity preventing foreign matter from entering the suction chamber 21 side) is improved.

(4) In the second route, the foreign matter holding recess 44a is provided in the portion lower than the communication holes 48, so that the foreign matter separated in the second route are surely housed and held by the foreign matter holding recess 44a and, at the same time, the foreign matter removing capacity of this structure is improved.

(5) The outer circumferential edge portion 47b of the lid portion 47 slightly extends out from the outer circumferential surface 45c of the filter body 45, so that, in the second route, the sharp change effect of the refrigerant gas flowing direction is enhanced when the refrigerant gas passes through the space between the second step portion 44 and the lid portion 47, and then the centrifugal separation of the foreign matter is more effectively realized in the second route.

(6) The assembling of the filter body 45 to the rear housing 4 is carried out by pressing it, so that the assembling works can be easily carried out.

Second Embodiment

Figure 3A:
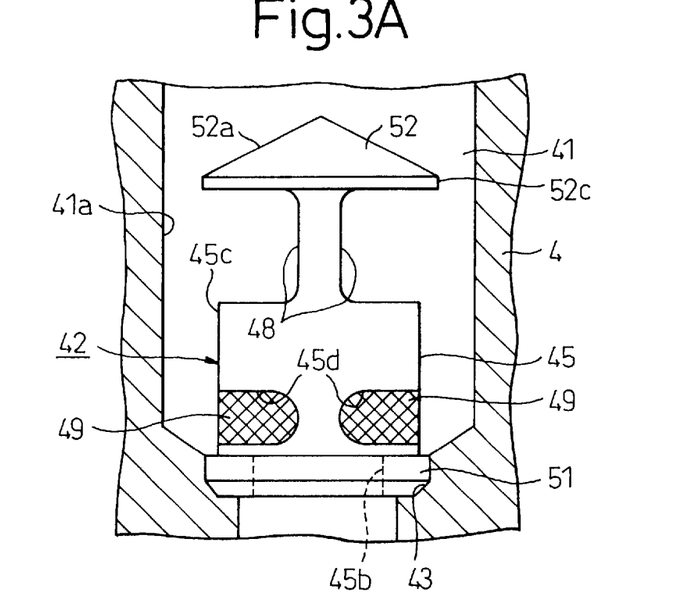
FIG. 3A is an enlarged view in the vicinity of a filter and shows the second embodiment.
Figure 3B:
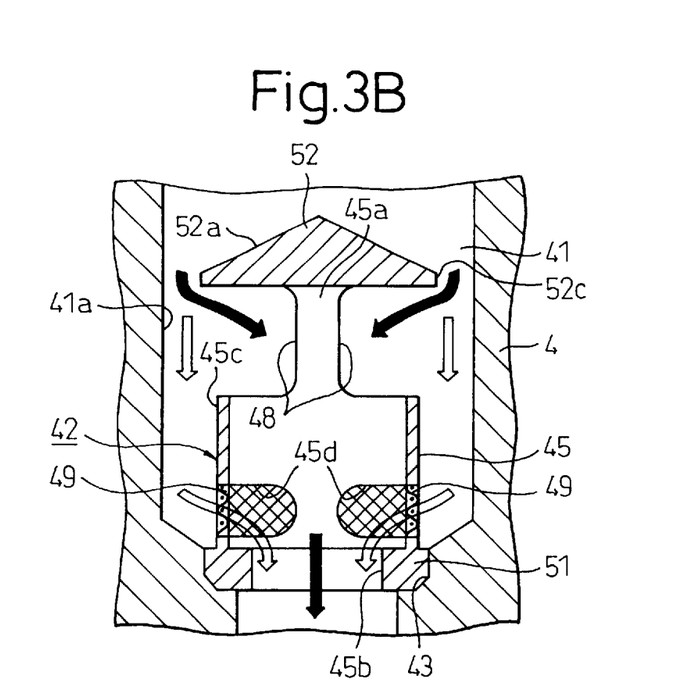
FIG. 3B is a longitudinal sectional view of the filter in FIG. 3A and shows the second embodiment.

As shown in FIGS. 3A and 3B, the filter body 45 is pressed into the suction passage 41 by a thick portion 51 formed in vicinity of the opening 45b in the downstream side and as the lower end surface of the thick portion 51 comes into contact with the first step portion 43 (the second step portion 44 is omitted), the thick portion 51 is secured in the rear housing 4 and is positioned therein. Therefore an annular gap between the outer circumferential surface 45c of the filter body 45 and the inner circumferential surface 41a of the suction passage 41 is closed in a state where the annular area of the first step portion 43 comes into contact with that of the thick portion 51, more downstream than the filter elements 49.

A lid portion 52 is provided in the filter body 45 so that it closes the opening 45a in the upstream side. An outer circumferential edge portion 52c of the lid portion 52 slightly extends out from the outer circumferential surface 45c of the filter body 45 so as to form a convex portion 52c. An upper end surface 52a of the lid portion 52 is formed in a cone shape directed to an upstream side of the suction passage 41.

In the present embodiment, the lid portion 47 is omitted together with the filter element 50 and only the filter element 49 is provided in the filter body 45.

A refrigerant gas flowing into the suction passage 41 from the external refrigerant circuit 30 (the evaporator 33) is biased to the side of the lid portion 52 by the upper end surface 52a of the lid portion 52 opposing to the refrigerant gas flow. Most part of the refrigerant gas biased to the side of the lid portion 52, then, reaches the suction chamber 21 through either of the two routes described below.

First Route

A part of the refrigerant gas, biased to the side of the lid portion 52 in the suction passage 41, flows through a space between the outer circumferential surface 45c of the filter body 45 and the inner circumferential surface 41a of the suction passage 41 and flows into the filter body 45, as shown in FIG. 3B by white arrows, while foreign matter is removed in the filter elements 49. The refrigerant gas, flowing into the filter body 45 after the foreign matter is removed, is discharged to the outside of the filter body 45 through the opening 45b in a downstream side.

Second Route

A part of the refrigerant gas, which is biased to the side of the lid portion 52 in the suction passage 41 and the flow direction of which is sharply changed so as to turn around the outer circumferential edge portion 52c of the lid portion 52, flows into the filter body 45 through the communication holes 48, as shown in FIG. 3B by black arrows.

As a result, the foreign matter in the refrigerant gas is centrifugally separated from the refrigerant gas by the sharp change of the gas flow direction, so that the foreign matter is moved (falls), together with the refrigerant gas flow passing through the first route, into a space, having a bottom, between the outer circumferential surface 45c of the filter body 45 and the inner circumferential surface 41a of the fluid passage 41, that is, inside the foreign matter holding recess positioned in the region lower than the communication holes 48, and are held by the filter element 49 in said space. The refrigerant gas, which flows into the filter body and from which the foreign matter is removed, is discharged out of the filter body 45 through the opening 45b located in a downstream side.

In this embodiment the following effects, other than the same effects as those of the items (1), (2), and (6) in the first embodiment described above, are also obtained.

(1) In the lid portion 52, the upper end surface 52a opposing to the refrigerant gas flow has a circular cone shape, so that it is ensured that the effect of sharp change of the refrigerant gas flow direction at the outer circumferential edge portion 52c of the lid portion 52 is improved, when it is compared with the case in which the upper end surface 52a has, for example, a plane plate shape (this shape does not deviate from the concept of the present invention). Therefore the foreign matter separating effect in the second route is more effectively realized.

(2) The outer circumferential edge portion 52c of the lid portion 52 slightly extends out from the outer circumferential surface 45c of the filter body 45, so that in the second route the effect of the sharp change of the refrigerant gas flowing direction, in which the refrigerant gas flows through the outer circumferential edge portion 52c of the lid portion 52, is enhanced and the foreign matter separating effect in the second route is more effectively realized.

Third Embodiment

Figure 4A:
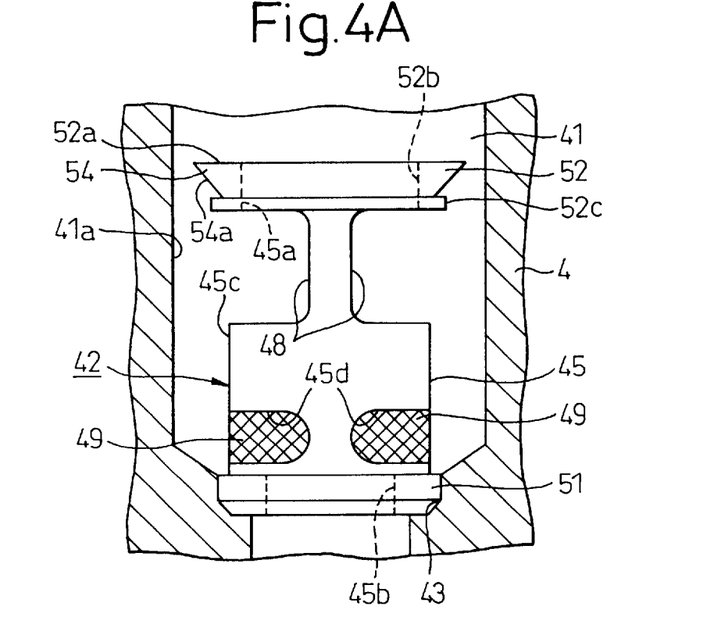
FIG. 4A is an enlarged view in the vicinity of a filter and shows the third embodiment.
Figure 4B:
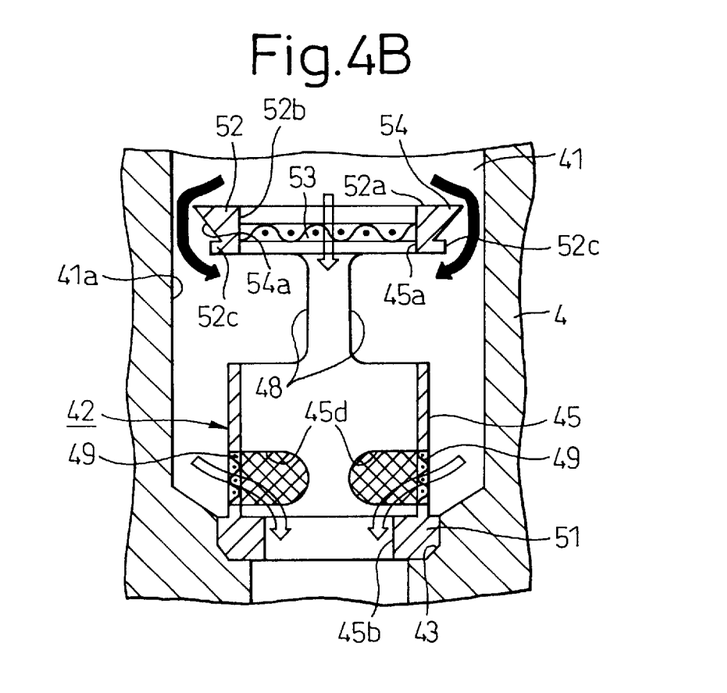
FIG. 4B is a longitudinal sectional view of the filter in FIG. 4A and shows the third embodiment.

As shown in FIGS. 4A and 4B, the differences between this embodiment and the above-mentioned second embodiment are that the upper end surface 52a of the lid portion 52 has a plane surface, that a through hole 52b is drilled in the lid portion 52 and a filter element 53 is installed in the through hole 52b so as to close it, that in the outer circumferential surface 45c of the filter body 45 two convex portions 52c, 54 are provided in the upstream side of the communication holes 48, and that the outer circumferential surface 54a of the convex portion 54 has a tapered surface which has a smaller diameter in the communication holes 48 side.

In this embodiment the following effects, other than the same effects as those of the items (1), (2), and (6) in the first embodiment described above, are also obtained.

(1) The filter element 53 is installed in the lid portion 52 and a new route for the refrigerant gas is formed, in which the refrigerant gas passes through the filter element 53 so as to flow into the filter body 45, so that the foreign matter removing capacity of this structure is improved.

(2) In the outer circumferential surface 45c of the filter body 45 the convex portions 52c, 54 are provided in the upstream side of the communication holes 48, so that the sharp change effect of the flowing direction in which the refrigerant gas passes through the side of the lid portion 52 and flows to the communication holes 48 is enhanced and the centrifugal separation of the foreign matter is more effectively realized. In particular, it is confirmed that the outer circumferential surface 54a, of the convex portion 54 having a tapered shape, effectively guides the refrigerant gas to flow into the communication holes 48 and, as a result, the sharp change effect of the refrigerant gas flowing direction is more enhanced.

Embodiments described below can be realized within the range of the concept of the present invention without deviation therefrom.

In the above-mentioned first embodiment, the filter elements 49, 50 are installed only on either of the filter body 45 or the lid portion 47 and either of the through holes 45d or 47a is plugged (omitted). In particular, when the filter elements 49, 50 are installed only on the lid portion 47, the choice of the positions in which the communication holes 48 can be provided is increased.

In the above-mentioned first embodiment, one of the filter element materials is machined in a three-dimensional shape (for example, a cylindrical shape having a bottom), so that the filter element 49 of the filter body 45 are integrated with the filter element 50 of the lid portion 47.

In the above-mentioned first embodiment, the whole of the lid portion 47 may consist of the filter element 50.

In the above-mentioned second embodiment, the upper end surface 52a of the lid portion 52 has a triangular pyramid shape, a quadrangular pyramid shape or the like. Same effect as of item (1) of the first embodiment can be obtained by such an embodiment.

In the above-mentioned second embodiment, the upper end surface 52a of the lid portion 52 has a hemispheric shape. Same effect as of item (1) of the first embodiment can be obtained by such an embodiment.

The number of the communication holes 48 is not restricted to two locations, but the communication holes 48 may be provided in a plurality of locations, such as three, four, five, or the like.

The filter body 45 may have a polygonal pipe shape, such as a triangular pipe shape, a quadrangular pipe shape, etc.

In the housing of the compressor, the foreign matter removing structure of the present invention may be provided in a discharge passage which communicates the discharge chamber 22 with the external refrigerant circuit 30 (a condenser 31). Foreign matter, for example, produced by the dead lock of the compressor, can be prevented by such an arrangement from being discharged into the external refrigerant circuit 30. Therefore, only the dead-locked compressor must then be replaced as the repair of an air conditioning system, so that the external circuit 30 need not be replaced. That is, if foreign matter enters the external refrigerant circuit 30 from the compressor, the external refrigerant circuit 30 must also be exchanged.

The foreign matter removing structure of the present invention is not limited to the application for the refrigerant circulation circuit, but it can be applied to a circuit for the displacement control of the compressor (the supply passage 28 to the crank chamber 5 to the bleed passage 27). For example, when the present structure is applied to the supply passage 28, it can prevent foreign matter from entering the crank chamber 5, so that it can prevent the deterioration of the compressor performance caused by the foreign matter entering sliding portions (for example, between the swash plate 12 and the shoes 19) arranged in the crank chamber 5. Furthermore, when the present structure is applied to the bleed passage 27, for example, foreign matter caused by a dead lock of the compressor can be prevented from being discharged into the suction chamber 21, and then the external refrigerant circuit 30, from the crank chamber 5, so that the external refrigerant circuit 30 need not be replaced.

The foreign matter removing structure of the present invention is not limited to the application to the refrigerant gas passage inside the compressor, but also it can be applied to the piping of the external refrigerant circuit 30 or the equipment 31 to 33 thereof.

The foreign matter removing structure of the present invention is not limited to the application to the refrigerant circulation circuit of the air conditioning system, but also it can be applied to a hydraulic circuit or a water circuit.

As described above in detail, according to the present invention, even if the blockage of the filter element occurs, the function of removing foreign matter can be maintained and at the same time it can be prevented, as much as possible, that the fluid flow is disturbed.

While the invention has been described by reference to specific embodiments chosen for the purposes of illustration, it should be apparent that numerous modifications could be made thereto by those skilled in the art without departing from the basic concept and scope of the invention.

What is claimed is:

1. A foreign matter removing structure: including a filter which can remove foreign matter in a fluid flowing through a fluid circuit;
   wherein the filter comprises
      a cylindrical filter body which is disposed in a fluid passage of the fluid circuit,
      a lid portion installed so as to close an opening, positioned in an upstream side of the fluid passage in the filter body,
      communication holes which penetrate through the filter body and communicate the inside of the filter body with the outside thereof, and
      one or a plurality of filter elements which are disposed in the filter body so as to be positioned more downstream than the communication holes;
   wherein a gap between an outer circumferential surface of the filter body and an inner circumferential surface of the fluid passage is closed more downstream than the filter elements.

2. A foreign matter removing structure, as set forth in claim 1, wherein the filter element is also disposed in the lid portion.

3. A foreign matter removing structure, as set forth in claim 1, wherein, on the outer circumferential surface of the filter body, a convex portion is provided upstream of the communication holes.

4. A foreign matter removing structure, as set forth in claim 3, wherein the outer circumferential surface of the convex portion is formed in a tapered shape which has a smaller diameter on the communication holes side.

5. A foreign matter removing structure, as set forth in claim 1, wherein the outer end surface of the lid portion is formed in a cone shape which opposes the fluid flow.

6. A compressor comprising the foreign matter removing structure, as set forth in claim 1, in a gas passage in the inside of the housing.

7. A compressor as set forth in claim 6: wherein the gas passage is a suction passage which communicates an external circuit with a suction chamber of the compressor, or a discharge passage which communicates the external circuit with a discharge chamber of the compressor.

8. An air conditioning system: comprising a refrigerant circulating circuit which consists of a compressor, a condenser, a pressure reducing device, and an evaporator;
   wherein a foreign matter removing structure, as set forth in claim 1, is disposed in a refrigerant passage of the refrigerant circulating circuit.

9. A foreign matter removing structure: including a filter which can remove foreign matter in a fluid flowing through a fluid circuit;
   wherein the filter comprises
      a cylindrical filter body which is disposed in a fluid passage of the fluid circuit,
      a lid portion installed so as to close an opening, positioned in the downstream side of the fluid passage in the filter body,
      communication holes which penetrate through the filter body and communicate the inside of the filter body with the outside thereof, and
      one or a plurality of filter elements which are disposed in at least one of the filter body and the lid portion so as to be positioned more downstream than the communication holes;
   wherein a gap between an outer circumferential surface of the filter body and an inner circumferential surface of the fluid passage is closed upstream of the communication holes;
   wherein, in the fluid passage, a foreign matter holding recess is formed below the communication holes; and
   wherein the foreign matter holding recess is annular and surrounds the fluid passage.

10. A foreign matter removing structure, as set forth in claim 9, wherein the filter elements are disposed in the filter body and the lid portion.

11. A compressor comprising the foreign matter removing structure, as set forth in claim 9, in a gas passage in the inside of a housing of the compressor.

12. A compressor as set forth in claim 11: wherein the gas passage is a suction passage which communicates an external circuit with a suction chamber of the compressor, or a discharge passage which communicates the external circuit with a discharge chamber of the compressor.

13. An air conditioning system: comprising a refrigerant circulating circuit which consists of a compressor, a condenser, a pressure reducing device, and an evaporator;
   wherein a foreign matter removing structure, as set forth in claim 9, is disposed in a refrigerant passage of the refrigerant circulating circuit.

14. A foreign matter removing structure as set forth in claim 9, wherein a diameter of the fluid passage at the downstream side of the foreign matter holding recess is smaller than that of the filter body.

* * * * *